United States Patent [19]

Plummer

[11] 4,356,538
[45] Oct. 26, 1982

[54] PHOTOGRAPHIC LIGHTING APPARATUS

[75] Inventor: William T. Plummer, Concord, Mass.

[73] Assignee: Polaroid Corporation, Cambridge, Mass.

[21] Appl. No.: 175,060

[22] Filed: Aug. 4, 1980

[51] Int. Cl.³ .................................................. F21S 3/00
[52] U.S. Cl. ........................................ 362/217; 362/3; 362/16; 362/347; 350/292; 350/293; 350/296
[58] Field of Search ................. 362/3, 16, 347, 217; 350/293, 294, 292, 296

[56] References Cited

U.S. PATENT DOCUMENTS

| | | | |
|---|---|---|---|
| 3,553,705 | 1/1971 | Ondrejka | 362/347 |
| 3,609,332 | 9/1971 | Schindler | 362/347 |
| 4,017,727 | 4/1977 | Yamamoto | 362/3 |
| 4,027,151 | 5/1977 | Bartnel | 350/294 |
| 4,173,036 | 10/1979 | Ferguson | 350/293 |
| 4,194,234 | 3/1980 | Geissler | 362/347 |
| 4,298,909 | 11/1981 | Krief | 362/17 |

FOREIGN PATENT DOCUMENTS 54-100174  8/1979  Japan ................................. 362/347

OTHER PUBLICATIONS

Goldberg, et al.; "Analysis of Para-Elliptic Reflector", Journal of the Optical Society of America, vol. 39, No. 6, pp. 497-500.

Primary Examiner—Donald P. Walsh
Attorney, Agent, or Firm—Francis J. Caufield

[57] ABSTRACT

An electronic strobe light which can either be built into or detachably connected with a photographic camera to provide a preferred illumination distribution over the field of view of the camera in order to maximize flash range and improve the quality of illumination for flash pictures. The strobe light includes a reflector that is bilaterally symmetric about the horizontal having a shape represented by a 6th order polynomial and a strobe tube which has its center offset with respect to the plane of symmetry of the reflector. This arrangement provides a vertically asymmetric distribution in the intensity of illumination over the picture area with higher intensities occurring at the central upper part of the picture area. Side-to-side illumination intensity is generally symmetric about the vertical and is controlled by a cylindrical Fresnel lens.

21 Claims, 10 Drawing Figures

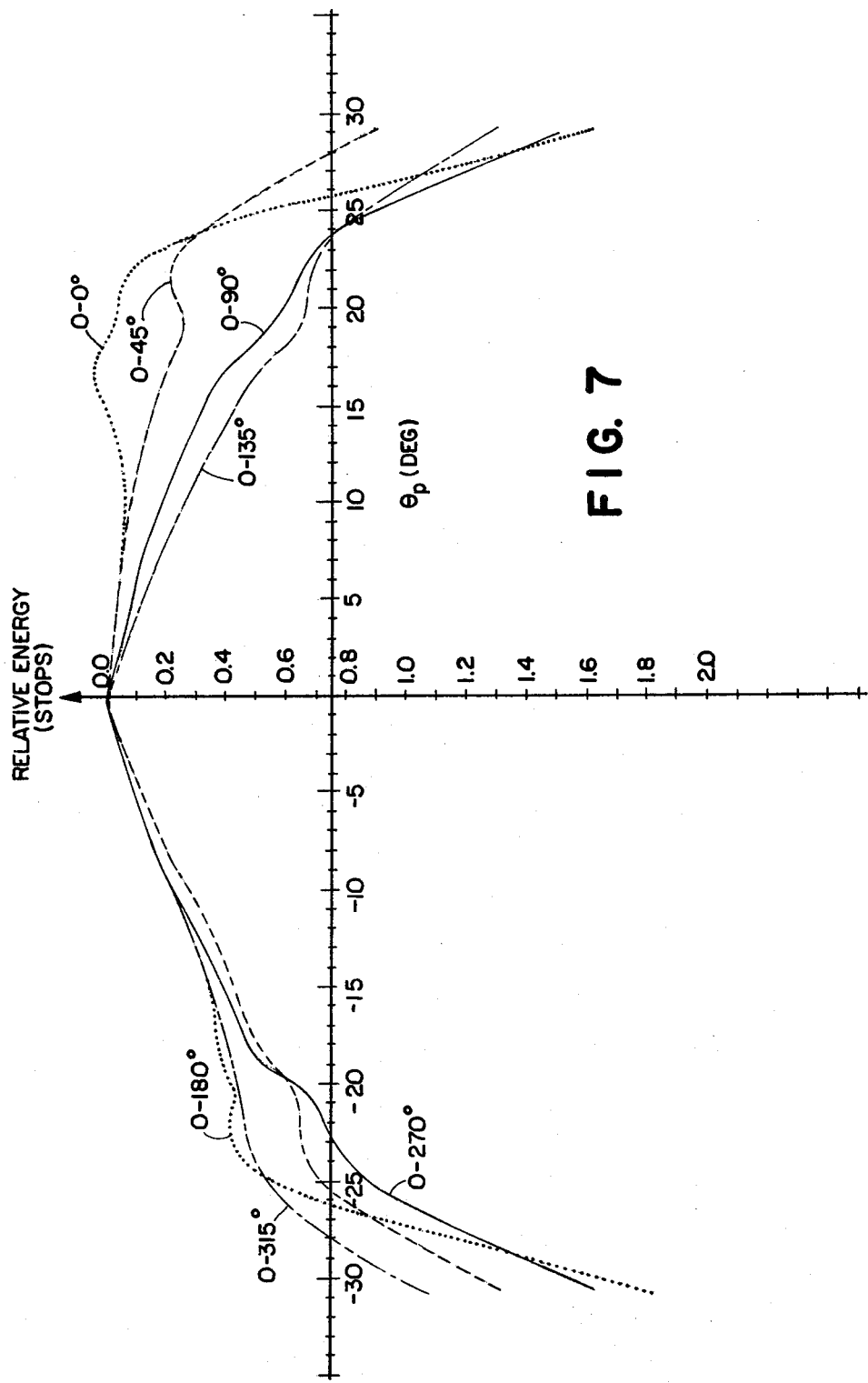

PHOTOGRAPHIC LIGHTING APPARATUS

BACKGROUND OF THE INVENTION

1. Field of the Invention

This invention in general relates to photography and in particular to an electronic strobe which can be either built into or detachably connected to a photographic camera to provide a preferred angular distribution in illumination intensity.

2. Description of the Prior Art

Electronic flash units for providing artifical illumination during photographic exposures to supplement natural light of low intensity are well-known in the art. Such electronic flash units are generally adapted to receive an external, substantially steady state DC battery voltage which powers a voltage converter in a conventional manner to convert the DC voltage, which may be on the order of 6 volts, to a suitable flash operating voltage. A charging current from the voltage converter is directed to a storage capacitor so as to gradually charge the storage capacitor to a DC voltage level which may be on the order of 350 volts. The charge stored in the capacitor is discharged by some suitable means through a tube which is filled with a mixture of rare gases such as argon, krypton or xenon. Through the well-known process of vapor discharge, the energy stored in the capacitor dissipated in this manner produces a brilliant flash of light for illuminating the scene.

The brilliance of the flash depends on the type of tube and the quantity of electricity discharged through it from the capacitor. The output of the tube is measured in watt-seconds or joules and depends on how efficiently the electrical charge stored in the capacitor is converted to radiant energy.

The radiant energy emanating from the tube travels in directions away from the tube which depend on the geometry of the tube. Some of the light naturally falls on the subject while as much or more travels away from the subject and is wasted. To optimize the amount of light falling on the scene, it is the usual practice to provide a selectively shaped reflector for intercepting rays of light traveling away from the subject and directing such rays toward the scene. It is usual to selectively shape such reflectors so that the distribution of the intensity of the illumination falling on the scene is uniform thereover.

Recently, compact versions of such electronic flash units have been adapted for use with self-developing type cameras which utilize film cassettes having a battery therein to provide power for various camera systems. In operation, such electronic flash units are connected to a camera which is loaded with a battery carrying cassette. The camera thereafter provides the electronic flash unit with a steady state input voltage which is utilized by the electronic flash unit to charge its storage capacitor. The storage capacitor is thereafter triggered at an appropriate time during the camera exposure interval by a select trigger signal furnished by the camera to discharge the capacitor through the flash tube thereby providing a source of artifical illumination. Such an electronic flash is described, for example, in U.S. Pat. No. 4,074,295 issued to Richard C. Kee on Feb. 14, 1978 and entitled "Compact Accessory Strobe For Cameras With Battery Enclosed Film Pack" and in U.S. Pat. No. 4,085,414 issued to John P. Burgarella on Apr. 18, 1978 and entitled "Electronic Flash Apparatus With Extendable On/Off Switch Control Apparatus".

In the virtually automatic self-developing type camera that is adapted to utilize an electronic flash and supply the power to charge the capacitor thereof from a battery contained in the film cassette positioned within the camera, it is obviously desirable that the electronic flash unit utilize as little of the battery energy as possible and also to convert that energy in an efficient manner to radiant energy since there are a number of camera electrical systems competing for the power contained in the film cassette battery. Those skilled in the art of designing automatic self-developing type cameras which utilize a single battery of limited capacity to power an entire camera cycle are sensitive to the demands which are placed on such a battery and have designed electronic control apparatus by which different camera electrical systems are automatically scheduled to derive power from the battery at different times in order to minimize current drain and in order to get maximum utility from the battery. For example, U.S. Pat. No. 3,846,812 discloses equipment which operates a flash camera of the automatic self-developing type so that only one operation of significant current drain occurs at a time. A film transport motor and a flash unit of the camera accordingly draw battery current at different times.

With the advent of automatic focusing arrangements for use in the self-developing type cameras, additional electrical operating loads of relatively high current drain are imposed on the camera battery. When such operations overlap with other camera operations of significant current drain, the battery voltage is likely to drop to such a degree that the battery is incapable of properly operating the camera. To overcome the additional current drains imposed by automatic focusing systems which are incorporated in self-developing type cameras those skilled in the art have provided camera control systems by which high current operations such as electronic flash unit charging are scheduled to occur one at a time so that a single battery can effectively power all the camera operations. Such a system is described, for example, in U.S. Pat. No. 4,156,565 issued to George C. Harrison on May 29, 1979 and entitled "Control System For Flash-Illuminated Automatic Focusing Camera".

It is evident in view of the prior art discussed above that electronic flash systems which are utilized in self-developing type cameras of the sort described should make maximum use for scene illumination purposes of whatever power is available as scheduled by the control circuit of the camera. For this purpose it has been the practice in the past to provide reflectors for increasing the illumination which falls on a photographic scene in order to make the most efficient use of the radiant energy available from a flash unit tube. Such reflectors have traditionally been shaped to redirect the illumination from the flash unit tube in such a way that the radiant energy from the flash tube, which includes the direct illumination from the tube as well as that reflected off of the reflector, is distributed so that the intensity thereof is symmetrically disposed about the camera optical axis and is also as uniform as possible.

It is a primary object of the present invention to provide an electronic flash unit which can be either built into a photographic camera or detachably connected thereto to provide a preferred distribution of illumination which permits maximum use of power available to the flash unit such that the maximum flash range of the camera which utilizes the electronic flash unit is greater than it would be with a flash unit operating at similar available power and having a uniformly distributed illumination pattern.

Other objects of the invention will in part be obvious and will in part appear hereinafter. The invention accordingly comprises the apparatus possessing the construction, combination of elements, and arrangement of parts which are exemplified in the following detailed disclosure.

SUMMARY OF THE INVENTION

This invention in general relates to photography and in particular to an electronic strobe light which can be either built into or detachably connected with a photographic camera to provide a preferred illumination distribution over the field of view of the camera in order to maximize flash range and improve the quality of illumination for flash pictures.

The strobe light of the invention comprises an artificial light assembly which includes an elongated cylindrical light source of given diameter and length.

Additionally included is a concave, open-ended reflector that is bilaterally symmetric about a plane. The reflector is of given width and has a constant cross-sectional shape in the form of a polynomial curve of at least third order. The polynomial curve has a radius of curvature, and hence optical power, which progressively changes in a gradual manner without discontinuities with distance along the curve. The curve is shaped so that the radius of curvature thereof increases with increasing distance from the apex thereof so as to reduce the optical power of the reflector in a predetermined manner with increasing distance along the curve.

Also included are means for positioning the source within the reflector in a predetermined manner to project a beam of illumination of predetermined angular divergence as measured in the reflector plane of symmetry and a plane orthogonal thereto to illuminate points on any plane normal to the reflector plane or symmetry, spaced ahead of the assembly and within the beam angle of divergence and effective range, with a preferential distribution of illumination. The reflector operates to reflect light from the source in a manner whereby the illumination of the points, above and below a central axis in any normal plane, defined by the intersection of the reflector plane of symmetry and any normal plane, progressively increases in a gradual manner without discontinuities in accordance with increasing angular divergence of the beam measured away from the reflector plane of symmetry to compensate for natural losses in illumination which would otherwise be present at those same points absent the reflector; to abruptly cause a reduction in the intensity of illumination of points on any normal plane, above and below that normal plane central axis, which points correspond to an angular divergence beyond a predetermined value.

In a preferred embodiment of the invention the reflector curve shape is in the form of a 6th order polynomial and the light source has its central axis offset with respect to the reflector plane of symmetry such that light is reflected generally from apical regions of the reflector to cause an asymmetry in the intensity of illumination falling on any normal plane, about the normal plane central axis, without substantially changing the angular divergence of the projected beam of light above and below the reflector plane of symmetry. The asymmetry operates to more intensely illuminate points on one side of any normal plane central axis than correspondingly located points on the opposite side thereof.

DESCRIPTION OF THE DRAWINGS

The novel features that are considered characteristic of the invention are set forth with particularity in the appended claims. The invention itself, however, both as to its organization and method of operation together with other objects and advantages thereof will best be understood from the following description of the illustrated embodiment when read in connection with the accompanying drawings wherein like numbers have been employed in the different figures to denote the same parts and wherein:

FIG. 7 is a graph showing the intensity of illumination as a function of angular field position along different lines of the normal plane of FIG. 5.

DESCRIPTION OF THE PREFERRED EMBODIMENT

Figure 1:
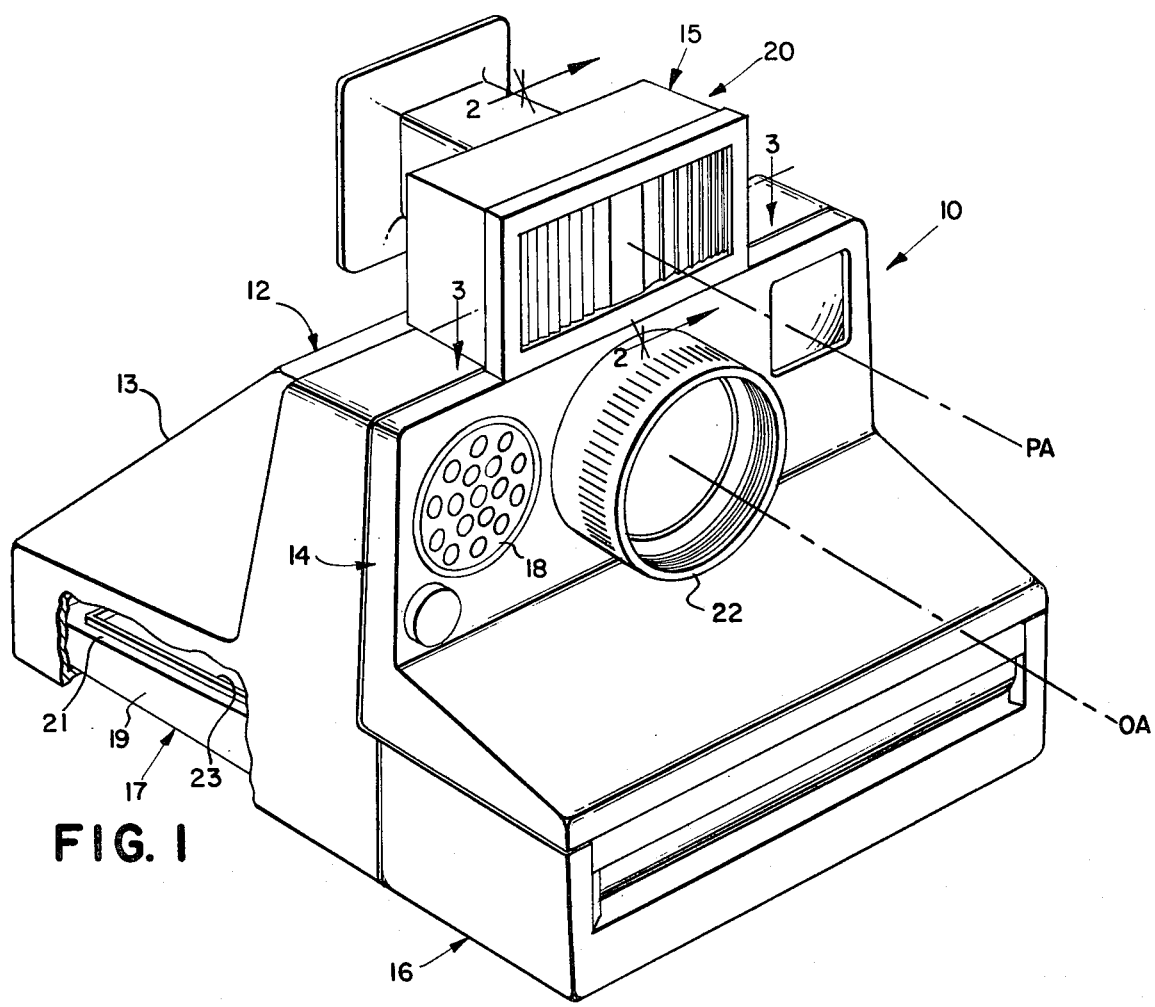
FIG. 1 is a perspective view of the electronic strobe light of the invention shown in combination with a photographic camera having parts broken away.

The present invention in general relates to photography and in particular to an electronic flash apparatus which can be either built into a photographic camera or camera apparatus or structured in a well-known manner for detachable connection with such apparatus. In its preferred embodiment, the electronic flash apparatus of the present invention is shown combined with a virtually fully automatic type camera which utilizes self-processable type film and which is designated generally at 10 in FIG. 1. Although shown combined with the camera 10, it is to be understood that the electronic flash apparatus of the invention, which is designated generally at 20 in FIG. 1, is not limited in use to only those types of photographic apparatus represented by the camera 10. However, as will be discussed below, the camera 10 does have certain features which make the invention at least in part particularly suitable for use with it.

As best seen in FIG. 1, the camera 10 is a rigid, non-folding body type which includes a generally prismatic shaped major housing 12, a generally L-shaped front housing 14, and a generally rectangularly-shaped film loading door 16, which collectively define its outward appearance and serve to house and protect its interior components. The aforementioned housings, 12 and 14, and the film loading door 16 are all preferably molded of an opaque plastic to preclude unwanted light from entering the camera interior.

The base of the prismatic housing 12 is adapted in a well-known manner to releasably receive and hold a film cassette 17 in which is disposed a stacked array of self-processable film units, each of which is processed by the camera 10 in a well-known manner after photo-exposure, and a flat, thin battery which is positioned underneath the array of film units (neither shown). The film cassette 17 includes a generally parallelepiped housing 19 which has an upwardly facing wall 21 having a generally rectangular aperture 23 therein. An example of such film cassettes is described in considerable detail in U.S. Pat. No. 3,872,487 issued to Nicholas Gold on Mar. 18, 1975 and entitled "Photographic Film Assemblage and Apparatus" and of such film units in, for example, U.S. Pat. Nos. 3,415,644; 3,594,165; and 3,761,268.

Located in the vertical forward wall of the L-shaped housing 14 is an objective taking lens 22 for imaging light from the scene onto the film contained in the cassette 17. The objective taking lens 22 may be a Cooke Triplet or similar multi-element type of lens which may have its focal length changed by adjusting the axial air spacing between its optical elements.

Focusing of the objective taking lens 22 is accomplished automatically through the use of a well-known ultrasonic ranging system which operates on well-known princples. Ultrasonic energy is transmitted by the system from an ultrasonic transducer 18 toward a subject to be photographed and is thereafter reflected by the subject back toward the camera 10. The characteristics of the transmitted and received signals are then compared to derive a control signal representative of the subject distance. The control signal is thereafter utilized to alter the air spacing between the elements of the objective taking lens 22 in order to set the air spacing in a manner appropriate to obtain sharply imaged photographs for the subject distance determined by the ultrasonic ranging system.

Figure 5:
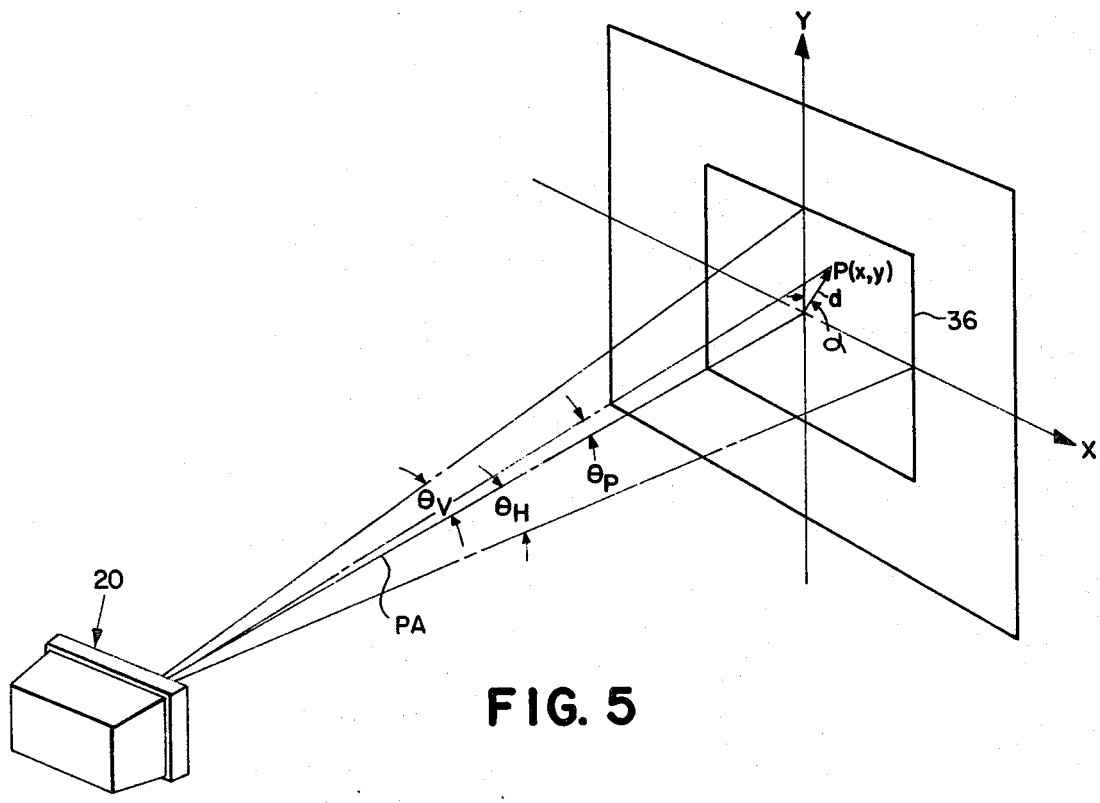
FIG. 5 is a diagrammatic perspective view of the electronic strobe light of the invention of FIG. 1 positioned forwardly of a normal plane in which the intensity of illumination provided by the strobe light can be measured.

The body 12 also includes a generally planar rear wall 13 which is slanted at a predetermined angle with respect to both the film cassette upwardly facing wall 21 and the optical axis, OA, of the objective taking lens 22. Attached to the interior of the rear wall 13, but not shown, is a trapezoidal shaped mirror positioned along the optical axis, OA, intersecting it at a predetermined angle, to provide a folded optical path between the objective taking lens 22 and an uppermost one of the stacked array of film units located in the film cassette 17. With this optical arrangement, rays from the scene being photographed, which emerge from the objective taking lens 22, are reflected from the mirror toward the film units to expose them. Moreover, it will be recognized by those skilled in the art that with this optical arrangement, the objective taking lens 22 and the peripheral edges of a film unit or the edges of the aperture 23 cooperate to provide the camera 10 with a field of view which defines the area in object space (the scene) that the camera 10 will record when a picture is taken. Referring to FIG. 5, the field of view of the camera 10 is specified by the semi-field angles, $\theta_v$ for the vertical, and $\theta_h$ for the horizontal.

After the objective taking lens 22 has been appropriately focused by the camera ultrasonic ranging system, film exposure takes place and is regulated by a well-known automatic exposure control system which operates to control the amount of exposure delivered to the film by selectively controlling the movement of a shutter blade mechanism (not shown). The blade mechanism comprises a pair of counter-reciprocating blades each of which includes an aperture which are made to overlap one another to provide a preprogrammed set of aperture values and shutter speeds over the entrance to the camera optical system light path. For this purpose, the blades are situated immediately forward of the camera light path entrance aperture which is located in registration with the objective taking lens 22 and are of the type more fully described in U.S. Pat. No. 3,942,183 issued to George D. Whiteside on Mar. 2, 1976 and entitled "Camera With Pivoting Blades".

The exposure control system (not shown) of the camera 10 includes the ultrasonic or sonar rangefinder for first determining camera-to-subject distance and then setting the objective taking lens focus condition to correspond to the determined camera-to-subject distance. Thereafter, the camera exposure control system provides a flash firing signal which occurs at an appropriate exposure aperture also corresponding to the determined camera-to-subject distance in a manner providing for a proportional fill-in flash under conditions of high ambient scene light intensity. Such an exposure control system is described in U.S. patent application Ser. No. 017,425 filed on Mar. 5, 1979 in the name of Bruce K. Johnson et al. and entitled "Camera With Auto Ranging Focusing and Flash Fire Control".

As will be appreciated by those skilled in the art, the various camera subsystems enumerated and, in addition, the requirement that the camera possess a system for automatically transporting and processing a self-developing film unit to its exterior after photoexposure, place unusual power demands on the film cassette battery. To provide maximum utility of the power available from the battery, the camera 10 also preferably includes an electronic control system which schedules the various current demands on the battery at different times so that no two of its systems are competing for battery power at the same time. Such a system is described in previously-referenced U.S. Pat. No. 4,156,565.

The electronic flash 20 of the invention is structured in a manner to be described to most efficiently utilize the power that has been scheduled for it by the camera electronic control system. The manner in which the electronic flash 20 accomplishes this may best be understood by now referring to FIGS. 2 and 3 wherein it can be seen that the electronic flash 20 includes a housing 15 which comprises an open-ended, box-like member 20 that is adapted to have slidably inserted and supported therein an open-ended, concave reflector support member 25. The support member 25 is structured to receive and support therein a reflector 24 in which is positioned an artificial light source 26. A cylindrical Fresnel lens 28 fits into the open end of the member 20 and overlies the open end of the reflector 24. The reflector support member 25, the reflector 24 and the Fresnel lens 28 all are secured in place in the member 20 by an apertured frame member 30 which preferably snaps around the peripheral edges of the open end of the member 20. For a more detailed description of the structural assembly and support features of the electronic flash 20 reference may be had to U.S. patent application Ser. No. 175,250, now U.S. Pat. No. 4,317,625, filed concurrently herewith in the name of David E. Van Allen and entitled "Strobe Reflector Assembly".

The artificial source 26 preferably comprises a conventional elongated, cylindrical flash tube which produces a brilliant flash of illumination through the well-known process of vapor discharge. For this purpose the flash tube 26 includes positive and negative terminals, 32 and 34, respectively, which attach to an electrode 35 extending through the flash tube 26 along its axis of rotation and a trigger terminal 38 all of which are connected to a well-known electronic control circuit 40 which operates in a well-known manner to charge a storage capacitor (not shown) from the cassette battery and to selectively discharge the flash tube 26 at an appropriate time in coordination with the camera exposure control system. The electronic control circuit 40 is controlled by the camera electronic charge regulation system (previously mentioned but not shown).

Extending through the electronic flash tube 26 is a projection axis, PA, along which light from the flash tube 26 generally travels. The flash tube 26 is positioned within the reflector 24 in a predetermined manner by a pair of angled spaced apart side walls, 42 and 44, thereof which include a pair of positioning cutouts, 48 and 50, respectively, for this purpose. The flash tube 26 is structured so that light directly emanating therefrom fills a solid angle that is larger than is necessary to illuminate the camera angular field of view. Those skilled in the art will recognize that the strobe tube 26 radiates light in all directions and for this reason behaves as an extended cylindrical source which from geometric considerations naturally tends to illuminate a solid angle much larger than a photographic camera angular field of view would reasonably occupy. Therefore much of the radiant energy which is contained in the flash of illumination provided by the electronic tube 26 would not normally be directed towards the photographic scene. However, to make more effective use of the radiant energy available from the electronic flash tube 26 the reflector 24 (FIG. 2) is provided.

Figure 2:
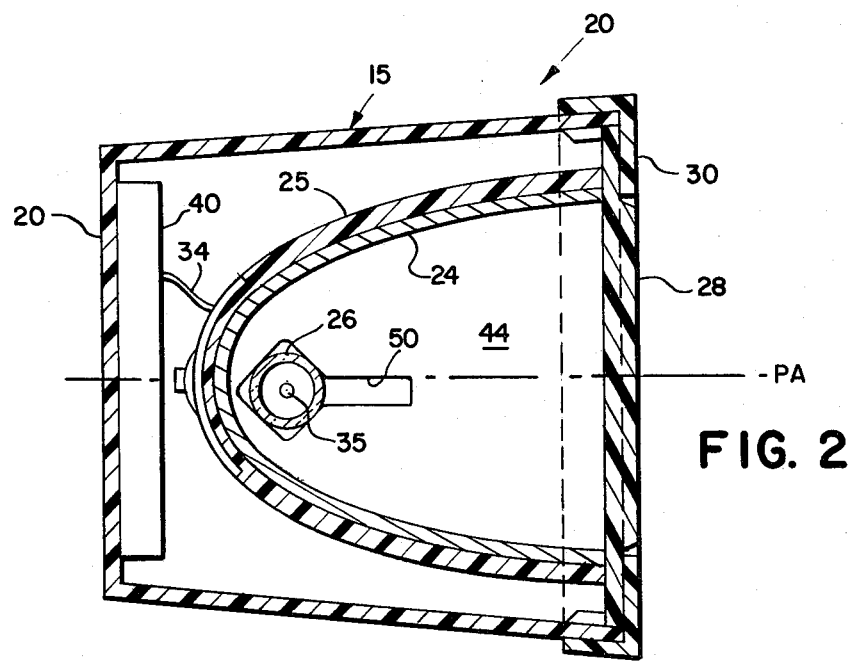
FIG. 2 is a cross-sectional view of the electronic strobe light of FIG. 1 taken generally along line 2—2 of FIG. 1.

The reflector 24 is elongated, open-ended and concave in the direction of the photographic scene. The width of the reflector is generally coextensive with the length of the elongated electronic flash tube 26 and the reflector 24 surrounds the tube to intercept light emanating therefrom to direct such light in a preselected manner onto the photographic scene. As can be seen in FIG. 2, the reflector 24 is bilaterally symmetric about the source projection axis, PA, and the flash tube 26 has its center offset a predetermined distance below the axis, PA. The reflector shape was experimentally determined in a manner and for reasons which will be subsequently explained.

Figure 4:
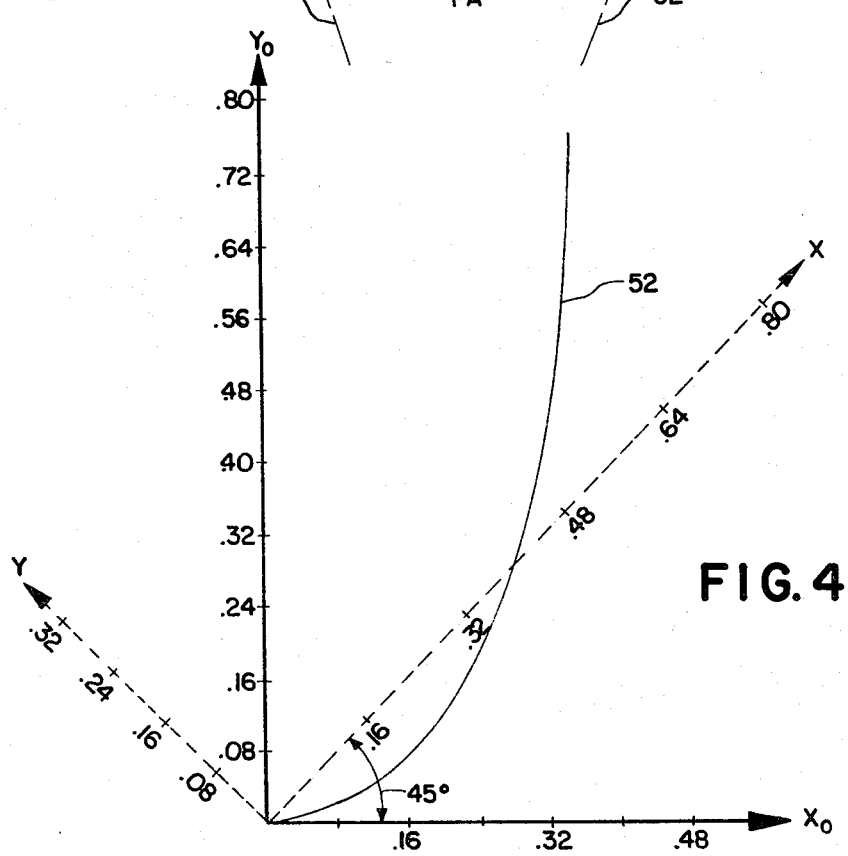
FIG. 4 is a graph giving the shape of the reflector of the invention in a Cartesian coordinate system.

The reflector 24 is formed in a well-known manner from a predetermined thickness of aluminum sheet and has a preferred cross-sectional shape in the form of 6th order polynomial curve which is shown at 52 in FIG. 4 and given by the equation:

$$Y = \sum_{n=0}^{6} A_n X^n$$

where Y and X are, respectively, the dependent and independent variables in a Cartesian coordinate system and the terms, $A_n$, represent coefficients of the polynomial. The values of the coefficients, $A_n$, are as follows:

$A_0 = 0.000999$
$A_1 = -0.90182248$
$A_2 = 4.8411086$
$A_3 = -14.130211$
$A_4 = 29.164005$
$A_5 = -30.30235$
$A_6 = 12.00036$ when the Cartesian coordinate system in which the polynomial is given (X-Y) is rotated by 45° with respect to a reference system, $X_0$-$Y_0$, as shown in FIG. 4.

For the foregoing reflector shape, the flash tube diameter is selected to be 0.142 inches, is spaced forward of the reflector apex by a distance of 0.040 inches, and has its center offset below the axis, PA, by a distance of 0.020 inches.

The upper portion of the reflector 24, i.e., the portion above the projection axis, PA, in FIG. 2, operates to direct radiation into the lower region of the picture field while the portion of the reflector which is below the projection axis, PA, operates to control the distribution of illumination provided by the electronic flash 20 in regions above the optical axis, OA, of the camera corresponding to the upper portion of the picture. The optical power of the reflector is proportional to the local radius of curvature as those skilled in the art will appreciate and changes with distance along the polynomial curve representing its profile.

The symmetric shape of the reflector 24 in combination with the flash tube offset operates to provide a vertically asymmetric distribution of illumination over the picture area with the peak illumination occuring at the central upper part of the picture area. This will best be understood by describing, in conjunction with the diagram of FIG. 5, a method by which the characteristic distribution of illumination intensity for the electronic flash 20 can be measured and characterized.

Referring now to FIG. 5, the electronic flash 20 is shown positioned forwardly of a plane defined by an orthogonal coordinate system (X-Y axis) whose origin is coincidental with the projection axis, PA. The plane thus defined is arranged normal to the projection axis, PA, and is preferably spaced away from the electronic flash 20 by a distance which is representative of the distances at which flash pictures are expected to be taken with the camera 10. Delineated on the normal plane is a rectangle 36 which generally defines the area which would be imaged within the field of view of the camera 10; the X-axis corresponding to the horizontal and the Y-axis corresponding to the vertical when the camera 10 is held in its normal picture taking attitude. As previously mentioned the angles $\theta_v$ and $\theta_h$ represent, respectively, the semi-field angles in the vertical and horizontal directions.

Once the normal plane is defined and the field of view of the camera is established on it, photo-integrators (not shown) are placed on the plane at equally spaced apart points surrounding its origin, O. The electronic flash 20 is then fired, the total flux at each point measured in some conventional units such as meter-candle-seconds and the resultant data tabulated in a form convenient for graphical presentation. For example, the location of a point, P(x, y), can be expressed in terms of its distance, d, from the origin and an angle $\alpha$ which is the angle between a line drawn from the origin, O, to the point P and the Y-axis or by the angle $\alpha$ and a semi-field angle, $\theta_p$, which is the angle between the axis, PA, and a line drawn from the center of the Fresnel lens 28 to the point, P (x, y). Either convention for describing the location of all points on the normal plane is acceptable.

Figure 6:
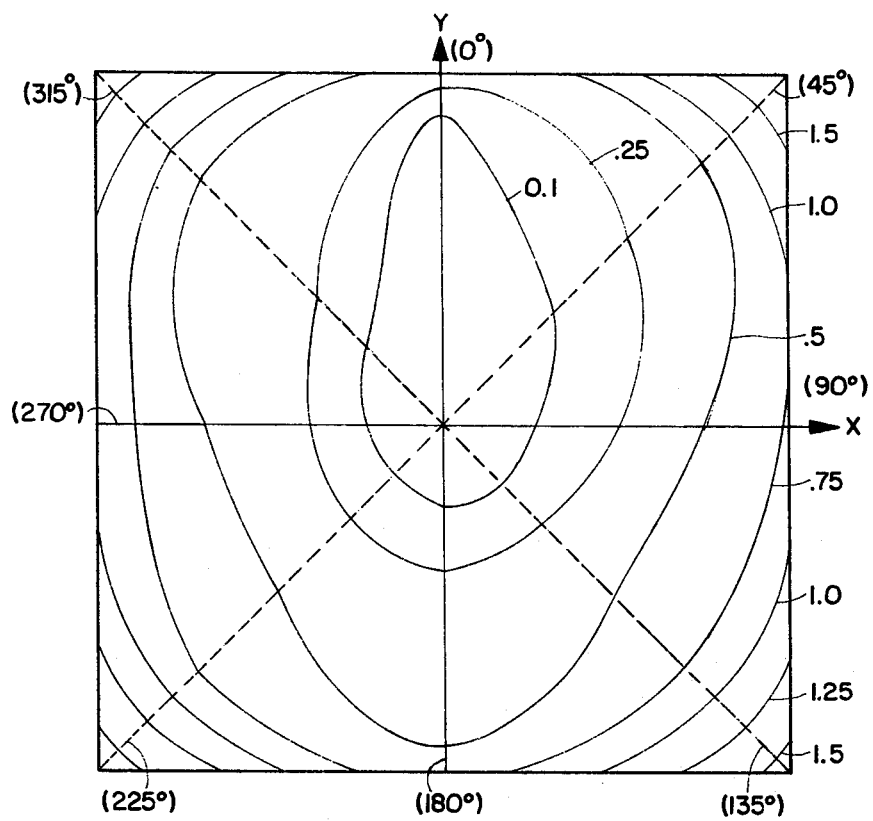
FIG. 6 is a contour plot showing the distribution of the intensity of light provided by the invention as measured in the normal plane in FIG. 5—each contour line thereof representing constant light intensity.

The distribution of illumination for the foregoing configuration of the electronic flash 20, measured in the foregoing manner, on a normal plane spaced approximately 5 feet forward of the electronic flash 20 is presented in FIG. 6 as a series of contour lines each representing the difference in illumination expressed in stops when compared to the peak intensity of illumination measured on the normal plane. Thus, for example, the contour line identified as 0.1 is a line of constant illumination intensity which is −0.1 stops lower than the peak intensity measured on the normal plane. The other contour lines identified as 0.25, 0.5, 0.75, and so forth, indicate lines of constant illumination intensity which are also lower than the peak intensity. The calculations for arriving at the contour lines were made in accordance with the following equation:

$$\text{Difference in stops} = \log_2\left(\frac{\text{measured intensity}}{\text{measured peak intensity}}\right)$$

The rectangle 36 in FIG. 5 which indicates the boundaries of the camera field of view in this case has a semi-field angle of approximately 19° for both the horizontal and vertical directions.

FIG. 7 presents the variation in the intensity of the illumination over the normal plane as a function of semi-field angle, $\theta_p$, for points on different lines in the normal planes oriented at different angles, $\alpha$, as shown on the contour map of FIG. 6. The semi-field angle, $\theta_p$, represents the position of a point P (x, y) along each one of the lines where the angle, $\alpha$, is constant. Thus, the curve in FIG. 7 identified as 0°-0° represents the change in illumination (relative energy in stops) with semi-field angle, $\theta_p$, as measured along the line correspondingly identified as 0°-0° in FIG. 6. The other curves in FIG. 7 likewise are associated with the correspondingly identified lines given in FIG. 6. Positive $\theta_p$ in FIG. 7 represents the illumination distribution to the right of the 0°-180° line of FIG. 6 while negative $\theta_p$ represents the field positions of points located to the left of the 0°-180° line in FIG. 6. The change in illumination in FIG. 7 is expressed in stops which indicates the relative intensity of the various points on the normal plane compared with the peak intensity measurement made.

In both FIGS. 6 and 7, it can be appreciated that the angular distribution in the intensity of the illumination which is provided by the electronic flash 20 is asymmetric about the source projection axis, PA, when measured in at least one reference plane, i.e., the plane formed by extending the 0°-180° line in FIG. 6 perpendicular to the normal plane of FIG. 5 and through the source projection axis, PA. This reference plane is thus parallel to the general direction of projection of the beam provided by the electronic flash 20. The angular intensity distribution of the beam of illumination of the electronic flash 20, in the reference plane (see 0°-180° line of FIG. 7), decreases in correspondence with semi-field angle on one side of the source projection axis, PA, at a faster rate than on the opposite side thereof so that points in a photographic scene which are spaced ahead of the camera and located on one side of the camera optical axis, OA, are more intensely illuminated than equidistant correspondingly located scene points on the other side of the camera optical axis. That is, points in FIG. 6 which are located above the 90°-270° line are more intensely illuminated than correspondingly located points below the 90°-270° line. Thus, the asymmetric distribution of illumination provided by the electric flash 20 operates to increase the illumination range of the apparatus with respect to subject matter located above the 90°-270° (horizontal) line which represents the upper half of the scene, above the camera optical axis, OA, since points located in the upper half of the scene are more intensely illuminated.

The intensity of the illumination provided by the electronic flash 20 as represented by the graphs and plots of FIGS. 6 and 7 represent the illumination distribution pattern which would obtain in the photographic scene assuming the camera 10 were held in its normal picture taking attitude. From the information presented in FIGS. 6 and 7 it can be readily appreciated that the beam of illumination provided by the electronic flash 20 has a predetermined angular divergence which is generally coextensive with the camera field of view when the electronic flash 20 is mounted or permanently built into the camera 10. The reflector 24 of the electronic flash 20 thus operates to increase the total amount of light falling on a scene to be photographed compared with the amount of direct light from the flash tube 26 that would otherwise illuminate a scene absent the reflector 24 and operates in combination with the strobe tube offset to provide an asymmetric distribution of illumination by shifting the angular distribution of the light without substantially changing its total angular divergence. Thus, the illumination provided by the electronic flash 20 is shifted in a useful way to a location in the scene where important subjects are most likely to be situated during picture taking. Consequently, the useful range of the electric flash 20 is increased compared to what it would otherwise be if the illumination distribution were symmetrically disposed about the camera optical axis, OA. In this manner, an increase in range is obtained for a given amount of energy available to charge the capacitor of the electronic flash 20 without requiring additional power for this purpose. In addition, certain aesthetic benefits are obtained since it is most likely that the important subject matter in the scene will occur in the upper regions of the scene and therefore the light which is provided by the electronic flash 20 is selectively directed to those regions to provide what is considered to be a more beneficial illumination pattern for exposure purposes.

The shape of the reflector 24 for the particular illumination distribution pattern described above was arrived at by an iterative empirical process which involved the steps of evaluating various reflector shapes through the measurement method outlined above followed by photographic evaluation and repeating these steps until the reflector shape was judged acceptable.

Figure 8:
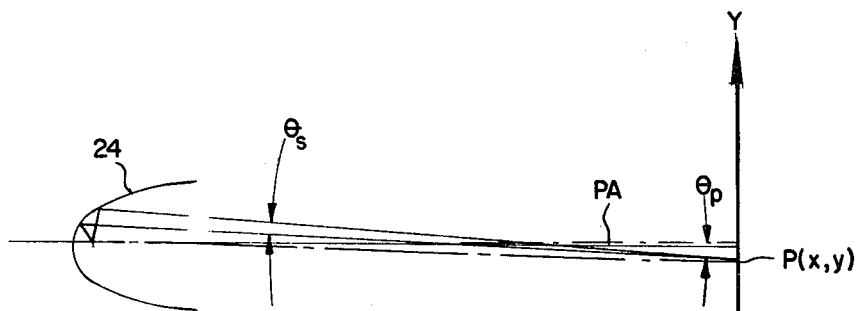
FIGS. 8, 9 and 10 are diagrammatic drawings indicating how representative light rays from the strobe tube of the invention are directed in a vertical plane by different parts of the reflector of the invention to different angular field locations.
Figure 9:
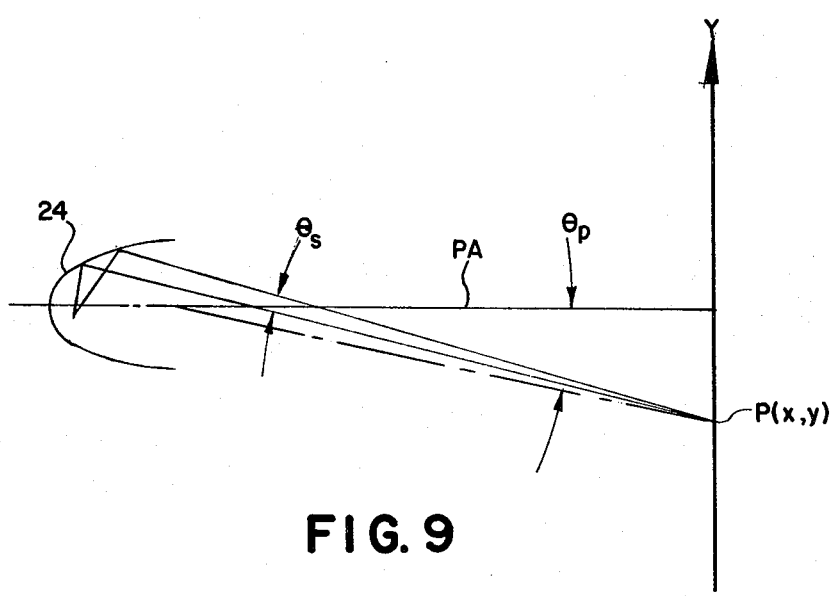
Figure 10:
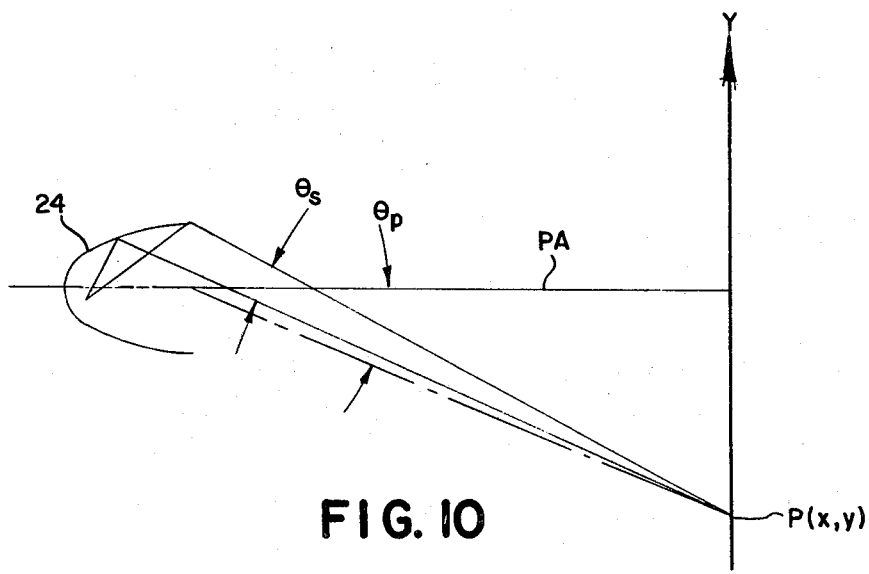

The manner in which the electronic flash 20 provides the illumination distribution patterns illustrated in FIGS. 6 and 7 may best be understood by now referring to FIGS. 8, 9 and 10 which illustrate diagrammatically the path which rays from the center of the strobe tube 26 take to different semi-field positions, P (X, Y), designated by the angle $\theta_p$ after the rays are reflected from different portions of the reflector 24. FIG. 8 illustrates that the smaller radii of curvature of the reflector 24, which are located near the apical region of the reflector 24, operate to control radiation emanating from the flash tube 26 in regions which are near the projection axis, PA. FIG. 10 illustrates that the largest radii of curvature of the reflector 24, which are located near the open end of the reflector 24, operate to control radiation near the extreme edges of the camera angular field of view and intermediate radii of curvature, shown diagrammatically in FIG. 9, operate to control radiation in regions of the scene intermediate the camera extreme angular field of view and the center of the picture area.

The intensity of the illumination or the brightness at a point, P (X, Y), on the normal plane is determined, in the vertical, by the solid angle subtended by the image of the flash tube 26 as seen in the reflector 24 from the point, P (X, Y), plus the solid angle subtended directly by the flash tube 26 as seen by the point, P (X, Y). Since the flash tube 26 is cylindrical, the directly subtended solid angle decreases as the distance of the point, P (X, Y), from the axis, PA, increases while the solid angle of the image of the flash tube 26, reflected from the reflector 24, and designated at $\theta_s$ in FIGS. 8, 9 and 10 increases with increasing distance away from the axis, PA. Therefore, the size of the defocused image of the flash tube 26 formed by the reflector 24 increases at off-axis field points so that the intensity of the illumination is progressively increased in a gradual manner in accordance with increasing angular divergence of the beam projected by the electronic flash 20 when measured from the reflector plane of symmetry to compensate for natural losses in illumination which would otherwise be present at those same points absent the reflector 24. The reflector 24 also operates to abruptly cause a reduction in the intensity of illumination of points on the normal plane (see FIG. 7) above and below the normal plane central axis which points correspond to an angular divergence beyond a predetermined value, i.e., the camera vertical angular field of view.

The offset of the flash tube 26 with respect to the reflector plane of symmetry operates to reflect light generally from apical regions of the reflector 24 to cause the asymmetry in the intensity of illumination falling on the normal plane, about the normal plane central axis, without substantially changing the angular divergence of the projected beam of light above and below the reflector plane of symmetry. This is because small vertical changes in tube location, such as the offset, affect the solid angle, $\theta_s$, more near apical regions of the reflector 34 where the reflecting surface is closest to the tube 26. The tube offset does not strongly effect light controlled by those portions of the reflector having larger radii of curvature and greater distance from the tube 26.

In this manner, the cross-sectional shape of the reflector 24 is used to control the distribution of the illumination in the vertical direction of the normal plane, i.e., in directions parallel to the y-axis thereof. The polynomial shape of the reflector 24 is specifically chosen because it permits complete control over the local radius of curvature of the reflector and therefore provides a means for controlling the local optical power of the reflector 24 in a manner whereby the optical power progressively changes gradually without discontinuities with distance along the curve. The polynomial curve is shaped so that the radius of curvature thereof increases with increasing distance from the apex of the reflector 24 so as to reduce the optical power of the reflector 24 in a predetermined manner with increasing distance along the curve. For such control over the illumination distribution, it is necessary that the polynomial curve representing the reflector shape 24 must be at least of order 3. When this is done, it has been discovered that the illumination intensity exhibits only small discontinuities which are difficult to visually detect when observing pictures taken with the electronic flash 20.

Figure 3:
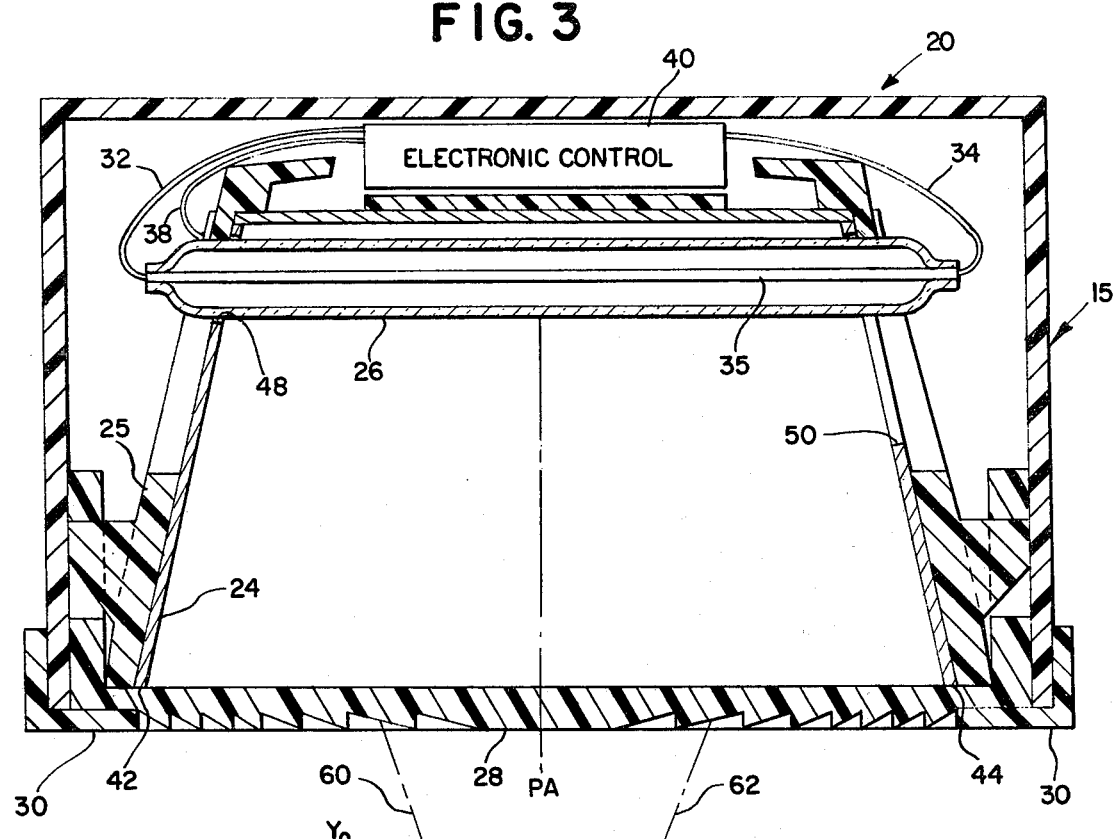
FIG. 3 is a cross-sectional view of the electronic strobe light of FIG. 1 taken generally along line 3—3 of FIG. 1.

Control of the intensity of the illumination in the horizontal direction is influenced by the cylindrical Fresnel lens 28 which is positioned to receive light emerging from the open end of the reflector 24 and is structured in a well-known manner to direct light intercepted thereby toward the vertical axis toward the normal plane (line 0°–180° in FIG. 6 or the Y-axis in FIG. 5) as indicated by the direction of travel of a pair of exemplary light rays, 60 and 62, in FIG. 3. The Fresnel lens 28 is provided so that the intensity of illumination of scene points correspondingly located on either side of the vertical is increased by equal amounts compared to what the intensity of illumination would be absent the lens 28 and so that the overall amount of illumination on the scene is further increased compared with what it would be absent the lens 28. The resultant angular distribution of illumination on either side of the vertical is symmetric thereabout.

Certain changes may be made in the above-described embodiments without departing from the scope of the invention. For example, the strobe tube offset and its spacing from the apex of the reflector 24 may be modified in accordance with the teachings of the invention and may be combined with changes in the polynomial shape of the invention to control the distribution of the intensity of illumination provided. Those skilled in the art may make still other changes according to the teachings of the disclosure. Therefore, it is intended that all subject matter contained in the above description or shown in the accompanying drawings shall be interpreted as illustrative and not in a limiting sense.

I claim:

1. An artificial lighting assembly comprising:

an elongated cylindrical light source of given diameter and length;

a concave, open-ended reflector, bilaterally symmetric about a plane, said reflector being of given width and having a constant nonconic, aspheric cross-sectional shape, said aspheric shape having a radius of curvature, and hence optical power, which progressively changes in a gradual manner without discontinuities with distance along said curve, said curve being shaped so that the radius of curvature thereof increases with increasing distance from th apex thereof so as to reduce the optical power of said reflector in a predetermined manner with increasing distance along said curve; and means for positioning said source within said reflector in a predetermined manner to project a beam of illumination of predetermined angular divergence as measured in said reflector plane of symmetry and a plane orthogonal thereto to illuminate points on any plane normal to said reflector plane of symmetry, spaced ahead of said assembly and within said beam angle of divergence and effective range, with a predetermined distribution of illumination, said reflector shape being structured to reflect light from said source in a manner whereby the illumination of said points due to said reflected light, above and below a central axis in any said normal plane defined by the intersection of said reflector plane of symmetry and any said normal plane, progressively increases in a gradual manner without discontinuities in accordance with increasing angular divergence of said beam measured away from said reflector plane of symmetry to compensate for natural losses in illumination which would otherwise be present at those same points absent said reflector; to abruptly cause a reduction in the intensity of illumination of points on any said normal plane, above and below that normal plane central axis, which points correspond to an angular divergence beyond a predetermined value.

2. The lighting assembly of claim 1 further including a cylindrical lens of predetermined power positioned to receive light emerging from said reflector open end and having an axis of curvature arranged perpendicular to said reflector plane of symmetry, said cylindrical lens operating to narrow the angular divergence of said beam of illumination as measured in planes parallel to said reflector plane of symmetry to increase the intensity of said beam of illumination so that points on any said normal plane on either side of an axis perpendicular to that normal plane central axis and through the center of that normal plane are more intensely illuminated than they otherwise would be absent said cylindrical lens.

3. The assembly of claim 2 wherein said cylindrical lens is in the form of a Fresnel lens.

4. The lighting assembly of claim 1 wherein said polynomial equation is a 6th order polynomial of the form:

$$y = \sum_{n=0}^{6} A_n x^n$$

where y and x are, respectively, the dependent and independent variables in a Cartesian coordinate system and the terms, $A_n$, represent the coefficients of said polynomial.

5. The lighting assembly of claim 4 wherein the coefficients of said 6th order polynomial equation are given by:
$A_0 = 0.000999$
$A_1 = -0.90182248$
$A_2 = 4.8411086$
$A_3 = -14.130211$
$A_4 = 29.164005$
$A_5 = -30.30235$
$A_6 = 12.00036$ when said polynomial equation is specified in a Cartesian coordinate system that has been rotated by 45°.

6. An artificial lighting assembly comprising:
an elongated cylindrical light source of given diameter and length;
a concave, open-ended reflector, bilaterally symmetric about a plane, said reflector being of given width and having a constant nonconic, aspheric cross-sectional shape, said aspheric shape having a radius of curvature, and hence optical power, which progressively changes in a gradual manner without discontinuities with distance along said curve, said curve being shaped so that the radius of curvature thereof increases with increasing distance from the apex thereof so as to reduce the optical power of said reflector in a predetermined manner with increasing distance along said curve; and
means for positioning said source within said reflector in a predetermined manner to project a beam of illumination of predetermined angular divergence as measured in said reflector plane of symmetry and a plane orthogonal thereto to illuminate points on any plane normal to said reflector plane of symmetry, spaced ahead of said assembly and within said beam angle of divergence and effective range, with a predetermined distribution of illumination, said reflector shape being structured to reflect light from said source in a manner whereby the illumination of said points due to said reflected light, above and below a central axis in any said normal plane defined by the intersection of said reflector plane of symmetry and any said normal plane, progressively increases in a gradual manner without discontinuities in accordance with increasing angular divergence of said beam measured away from said reflector plane of symmetry to compensate for natural losses in illumination which would otherwise be present at those same points absent said reflector; to abruptly cause a reduction in the intensity of illumination of points on any said normal plane, above and below that normal plane central axis, which points correspond to an angular divergence beyond a predetermined value; said light source having its central axis offset with respect to said reflector plane of symmetry such that light reflected generally from apical regions of said reflector operates to cause an asymmetry in the intensity of the illumination falling on any said normal plane, about that normal plane central axis, without substantially changing said angular divergence of said projected beam of light above and below said reflector plane of symmetry, said asymmetry operating to more intensely illuminate points on one side of any said normal plane central axis than correspondingly located points on the opposite side thereof.

7. The lighting assembly of claim 6 further including a cylindrical lens of predetermined power positioned to receive light emerging from said reflector open end and having an axis of curvature arranged perpendicular to said reflector plane of symmetry, said cylindrical lens operating to narrow the angular divergence of said beam of illumination as measured in planes parallel to said reflector plane of symmetry to increase the intensity of said beam of illumination so that points on any said normal plane on either side of an axis perpendicular to that normal plane central axis and through the center of that normal plane are more intensely illuminated than they otherwise would be absent said cylindrical lens.

8. The assembly of claim 7 wherein said cylindrical lens is in the form of a Fresnel lens.

9. The lighting assembly of claim 1 wherein said polynomial equation is a 6th order polynomial of the form:

$$y = \sum_{n=0}^{6} A_n x^n$$

where y and x are, respectively, the dependent and independent variables in a Cartesian coordinate system and the terms, $A_n$, represent the coefficients of said polynomial.

10. The lighting assembly of claim 9 wherein the coefficients of said 6th order polynomial equation are given by:
$A_0 = 0.000999$
$A_1 = -0.90182248$
$A_2 = 4.8411086$
$A_3 = -14.130211$ $A_4 = 29.164005$
$A_5 = -30.30235$
$A_6 = 12.00036$
when said polynomial equation is specified in a Cartesian coordinate system that has been rotated by 45°.

11. A reflector for directing illumination from an elongated artificial light source in a predetermined manner, said reflector being of given width, bilaterally symmetric about a plane and having a constant, non-conic aspheric cross-sectional shape mathematically described by a 6th order polynomial equation, said polynomial equation having a radius of curvature, and hence optical power, which progressively changes in a gradual manner without discontinuities with distance along said curve, said equation describing a curve having a shape the radius of curvature of which increases with increasing distance from the apex thereof so as to reduce the optical power of said reflector in a predetermined manner with increasing distance along said curve, said 6th order polynomial equation being of the form:

$$y = \sum_{n=0}^{6} A_n x^n$$

where y and x are, respectively, the dependent and independent variables in a Cartesian coordinate system and the terms, $A_n$, represent the coefficients of said polynomial and are given by:
$A_0 = 0.000999$
$A_1 = -0.90182248$
$A_2 = 4.8411086$
$A_3 = -14.130211$
$A_4 = 29.164005$
$A_5 = -30.30235$
$A_6 = 12.00036$
when said polynomial is specified in a Cartesian coordinate system that has been rotated by 45°.

12. The lighting assembly of claims 1 or 2 wherein said aspheric cross-sectional shape of said reflector is mathematically described by a preselected polynomial equation having nonzero terms of at least second and third order.

13. The lighting assembly of claims 6 or 7 wherein said aspheric cross-sectional shape of said reflector is mathematically described by a preselected polynomial equation having nonzero terms of at least second and third order.

14. An artificial lighting assembly comprising:
an elongated cylindrical light source of given diameter and length;
a concave, open-ended reflector, bilaterally symmetric about a plane, said reflector being of given width and having a constant nonconic, aspheric cross-sectional shape, said aspheric shape having a radius of curvature, and hence optical power, which progressively changes in a gradual manner without discontinuities with distance along said curve, said curve being shaped so that the radius of curvature thereof increases with increasing distance from the apex thereof so as to reduce the optical power of said reflector in a predetermined manner with increasing distance along said curve; and
means for positioning said source within said reflector in a predetermined manner to project a beam of illumination of predetermined angular divergence as measured in said reflector plane of symmetry and a plane orthogonal thereto to illuminate points on any plane normal to said reflector plane of symmetry, spaced ahead of said assembly and within said beam angle of divergence and effective range, with a predetermined distribution of illumination, said reflector surface being structured to form images of different parts of said source apparent on said reflector surface which images increase in size in correspondence with increasing angular divergence of said beam as measured away from said reflector plane of symmetry such that the illumination of said points from light reflected from said reflector, above and below a central axis in any said normal plane defined by the intersection of said reflector plane of symmetry and any said normal plane, is determined by the solid angle subtended by the said apparent images of said source as seen from said points, said solid angles subtended by said points increasing in size in accordance with increasing source image size whereby the illumination of said points, above and below a central axis in any said normal plane, progressively increases in a gradual manner without discontinuities in accordance with increasing angular divergence of said beam measured away from said reflector plane of symmetry to compensate for natural losses in illumination which would otherwise be present at those same points absent said reflector; to abruptly cause a reduction in the intensity of illumination of points on any said normal plane, above and below that normal plane central axis, which points correspond to an angular divergence beyond a predetermined value.

15. The lighting assembly of claim 14 wherein said nonconic, aspheric curve is mathematically described by a preselected polynomial equation having nonzero terms of at least second and third order.

16. An artificial lighting assembly comprising:
an elongated cylindrical light source of given diameter and length;
a concave, open-ended reflector, bilaterally symmetric about a plane, said reflector being of given width and having a constant cross-sectional shape in the form of a nonconic, aspheric curve which is mathematically continuous, has first and second derivatives which are continuous and which selectively vary so that the radius of curvature, and hence the optical power, of said aspheric curve progressively changes in a gradual manner without discontinuities with distance along said curve, said curve being configured so that the radius of curvature thereof increases with increasing distance from the apex thereof so as to reduce the optical power of said reflector in a predetermined manner with increasing distance along said curve; and
means for positioning said source within said reflector in a predetermined manner to form ahead of said reflector defocused real images of different parts of said source along different angular directions as measured in said plane of symmetry and a plane orthogonal thereto to illuminate points on any plane normal to said reflector plane of symmetry, spaced ahead of said assembly and within the effective range of said assembly, with a predetermined distribution of illumination, said reflector shape being structured to increase the apparent size of images of different parts of said source as seen formed on said reflector surface from said points whereby the illumination of said points due to reflected light from said source, above and below a central axis in any said normal plane defined by the intersection of said reflector plane of symmetry and any said normal plane, progressively increases in a gradual manner without discontinuities in accordance with increasing angular divergence measured away from said reflector plane of symmetry to compensate for natural losses in illumination which would otherwise be present at said points absent said reflector, to abruptly cause a reduction in the intensity of points on any said normal plane, above and below said normal plane central axis, which points correspond to an angular divergence beyond a predetermined value.

17. The lighting assembly of claim 16 wherein said nonconic, aspheric curve is mathematically described by a preselected polynomial equation having nonzero terms of at least second and third order.

18. An artificial lighting assembly comprising:
an elongated cylindrical light source of given diameter and length;
a concave, open-ended reflector, bilaterally symmetric about a plane, said reflector being of given width and having a constant nonconic, aspheric cross-sectional shape, said aspheric shape having a radius of curvature, and hence optical power, which varies continuously and as a function of at least two independent and arbitrary constants and progressively changes in a gradual manner without discontinuities with distance along said curve, said curve being shaped so that the radius of curvature thereof increases with increasing distance from the apex thereof so as to reduce the optical power of said reflector in a predetermined manner with increasing distance along said curve; and
means for positioning said source within said reflector in a predetermined manner to project a beam of illumination of predetermined angular divergence as measured in said reflector plane of symmetry and a plane orthogonal thereto to illuminate points on any plane normal to said reflector plane of symmetry, spaced ahead of said assembly and within said beam angle of divergence and effective range, with a predetermined distribution of illumination, said reflector shape being structured to reflect light from said source in a manner whereby the illumination of said points due to said reflected light, above and below a central axis in any said normal plane defined by the intersection of said reflector plane of symmetry and any said normal plane, progressively increases in a gradual manner without discontinuities in accordance with increasing angular divergence of said beam measured away from said reflector plane of symmetry to compensate for natural losses in illumination which would otherwise be present at those same points absent said reflector; to abruptly cause a reduction in the intensity of illumination of points on any said normal plane, above and below that normal plane central axis, which points correspond to an angular divergence beyond a predetermined value.

19. The lighting assembly of claim 18 wherein said aspheric cross-sectional shape of said reflector is mathematically described by a preselected polynomial equation having nonzero terms of at least second and third order.

20. An artificial lighting assembly comprising:
an elongated cylindrical light source of given diameter and length;
a concave, open-ended reflector, bilaterally symmetric about a plane, said reflector being of given width and having a constant cross-sectional shape in the form of a nonconic, aspheric curve which is mathematically continuous, has first and second derivatives which are continuous and which vary continuously so that the radius of curvature, and hence the optical power, of said aspheric curve progressively changes in a gradual manner without discontinuities with distance along said curve, said curve being configured so that the radius of curvature thereof increases with increasing distance from the apex thereof so as to reduce the optical power of said reflector in a predetermined manner with increasing distance along said curve; and
means for positioning said source within said reflector in a predetermined manner to form ahead of said reflector defocused real images of different parts of said source along different angular directions as measured in said plane of symmetry and a plane orthogonal thereto to illuminate points on any plane normal to said reflector plane of symmetry, spaced ahead of said assembly and within the effective range of said assembly, with a predetermined distribution of illumination, said reflector shape being structured to increase the apparent size of images of different parts of said source as seen formed on said reflector surface from said points whereby the illumination of said points due to reflected light from said source, above and below a central axis in any said normal plane defined by the intersection of said reflector plane of symmetry and any said normal plane, progressively increases in a gradual manner without discontinuities in accordance with increasing angular divergence measured away from said reflector plane of symmetry to compensate for natural losses in illumination which would otherwise be present at said points absent said reflector, to abruptly cause a reduction in the intensity of points on any said normal plane, above and below said normal plane central axis, which points correspond to an angular divergence beyond a predetermined value.

21. The lighting assembly of claim 20 wherein said aspheric cross-sectional shape of said reflector is mathematically described by a preselected polynomial equation having nonzero terms of at least second and third order.

* * * * *